United States Patent
Ugai et al.

(10) Patent No.: US 7,961,744 B2
(45) Date of Patent: Jun. 14, 2011

(54) FRAME MULTIPLEXING DEVICE

(75) Inventors: Kazukuni Ugai, Kawasaki (JP);
Hiroyuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 447 days.

(21) Appl. No.: 11/499,658

(22) Filed: Aug. 7, 2006

(65) Prior Publication Data

US 2007/0230492 A1  Oct. 4, 2007

(30) Foreign Application Priority Data

Mar. 28, 2006 (JP) ................. 2006-088795

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .............. 370/412; 370/230; 370/230.1; 370/231; 370/232; 370/233; 370/234; 370/235; 370/235.1; 370/236; 370/236.1; 370/236.2; 370/237; 370/238; 370/238.1; 370/239; 370/240

(58) Field of Classification Search ............... 370/230, 370/230.1, 231, 235, 235.1
See application file for complete search history.

(56) References Cited

U.S. PATENT DOCUMENTS

| | | | | |
|---|---|---|---|---|
| 5,313,455 A | * | 5/1994 | van der Wal et al. | 370/232 |
| 5,339,332 A | * | 8/1994 | Kammerl | 375/225 |
| 5,602,829 A | * | 2/1997 | Nie et al. | 370/235 |
| 5,721,944 A | * | 2/1998 | Gallet et al. | 713/502 |
| 5,905,730 A | * | 5/1999 | Yang et al. | 370/429 |
| 5,914,936 A | * | 6/1999 | Hatono et al. | 370/230 |
| 6,324,165 B1 | * | 11/2001 | Fan et al. | 370/232 |
| 6,441,601 B1 | * | 8/2002 | Clark et al. | 324/76.52 |
| 6,608,816 B1 | * | 8/2003 | Nichols | 370/235 |
| 6,798,746 B1 | * | 9/2004 | Kloth et al. | 370/235 |
| 6,891,834 B1 | * | 5/2005 | Dally et al. | 370/395.4 |
| 6,934,256 B1 | * | 8/2005 | Jacobson et al. | 370/235 |
| 7,215,641 B1 | * | 5/2007 | Bechtolsheim et al. | 370/235 |

(Continued)

FOREIGN PATENT DOCUMENTS

JP  04-150344  5/1992

(Continued)

OTHER PUBLICATIONS

Japanese Office Action mailed Oct. 5, 2010 in corresponding Japanese Patent Application No. 2006-088795.

*Primary Examiner* — Daniel J Ryman
*Assistant Examiner* — Andrew Oh
(74) *Attorney, Agent, or Firm* — Staas & Halsey LLP (57) ABSTRACT

A frame multiplexer includes a plurality of counters each of which is provided for each of the lines. A flow monitoring unit monitors frame flow of each line by referring to the counter of the line, and adds length of a passed frame to a value of the counter. A bandwidth managing unit cyclically selects one of the lines through which a frame is input, and subtracts a predetermined token value from a value of the counter of the selected line. An output control unit stores a frame passed through the flow monitoring unit in a queue buffer, and outputs the frame at an output rate of the frame multiplexer.

14 Claims, 5 Drawing Sheets

U.S. PATENT DOCUMENTS

| | | | |
|---|---|---|---|
| 7,274,668 B2 * | 9/2007 | Kyusojin et al. | 370/235 |
| 7,301,367 B1 * | 11/2007 | Kavipurapu et al. | 326/37 |
| 7,450,510 B1 * | 11/2008 | Wendorf et al. | 370/235 |
| 2001/0014081 A1 * | 8/2001 | Kawasaki et al. | 370/235 |
| 2001/0033581 A1 * | 10/2001 | Kawarai et al. | 370/468 |
| 2002/0097677 A1 * | 7/2002 | Hoar et al. | 370/230 |
| 2002/0152306 A1 * | 10/2002 | Tuck, III | 709/224 |
| 2003/0123390 A1 * | 7/2003 | Takase et al. | 370/230.1 |
| 2003/0137935 A1 * | 7/2003 | Kagan et al. | 370/229 |
| 2004/0233912 A1 * | 11/2004 | Droz et al. | 370/395.21 |
| 2004/0257997 A1 * | 12/2004 | Loewen et al. | 370/235 |
| 2005/0117576 A1 * | 6/2005 | McDysan et al. | 370/389 |
| 2005/0152289 A1 * | 7/2005 | Nagata et al. | 370/256 |
| 2005/0259623 A1 * | 11/2005 | Garudadri et al. | 370/335 |
| 2006/0153243 A1 * | 7/2006 | Shoham et al. | 370/503 |

FOREIGN PATENT DOCUMENTS

| | | |
|---|---|---|
| JP | 2000-049812 | 2/2000 |
| JP | 2002-368795 | 12/2002 |
| JP | 2005-033408 | 2/2005 |

* cited by examiner

FRAME MULTIPLEXING DEVICE

CROSS-REFERENCE TO RELATED APPLICATIONS

This application is based upon and claims the benefit of priority from the prior Japanese Patent Application No. 2006-088795, filed on Mar. 28, 2006, the entire contents of which are incorporated herein by reference.

BACKGROUND OF THE INVENTION

1. Field of the Invention

The present invention relates to a frame multiplexing device that multiplexes frames of variable length.

2. Description of the Related Art

Conventionally, a frame multiplexer is proposed as a communication device that multiplexes traffic input into the frame multiplexer such as Ethernet (registered trademark) frames (or packets) of variable length. When a total input rate becomes higher than an output rate of the frame multiplexer, congestion occurs and frames are discarded.

To prevent frames in traffic of a line having a narrow bandwidth from being discarded due to a line having a wide bandwidth, a function of multiplexing frames in traffic of the lines is necessary so that each of the lines has an equal output rate. A frame multiplexer using a queue buffer retrieving control with weighted round robin (WRR) is proposed as a frame multiplexer having such function.

Figure 8:
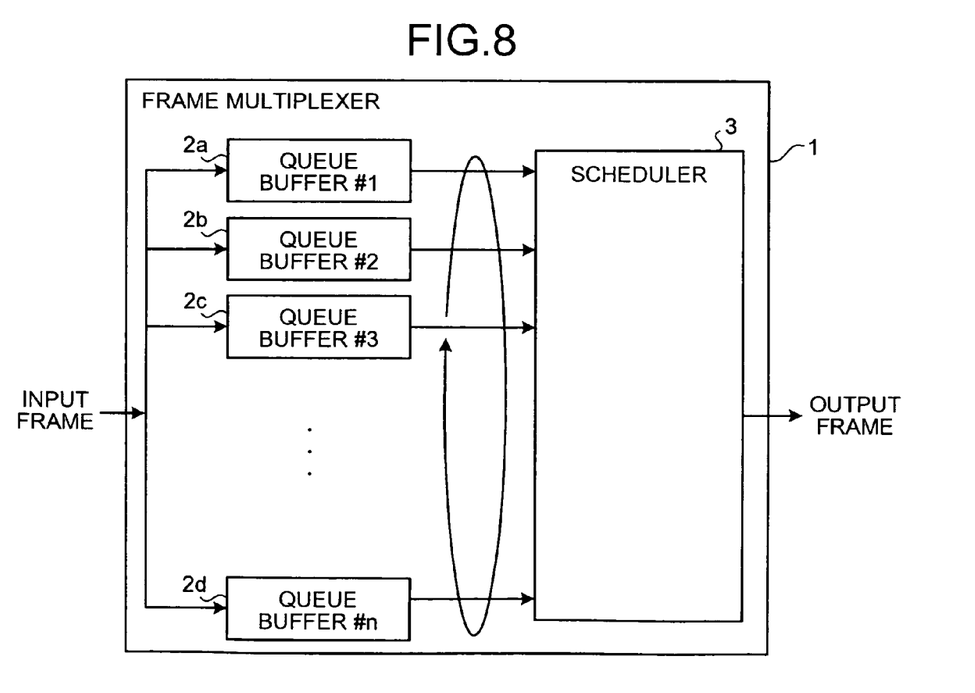
FIG. 8 is a block diagram of a conventional frame multiplexer.

FIG. 8 is a block diagram of a conventional frame multiplexer using the queue-buffer retrieving control with WRR. As shown in FIG. 8, a frame multiplexer 1 includes plural queue buffers #1 to #n (2a, 2b, 2c, 2d) and a scheduler 3. Each of the queue buffers 2a, 2b, 2c, 2d is provided for each of lines, and temporarily stores frames input from each of the lines into the frame multiplexer 1.

The scheduler 3 cyclically determines a retrieving order to retrieve a frame in each of the queue buffers 2a, 2b, 2c, 2d, so that an output rate of the frame multiplexer 1 corresponds to a weight assigned to each line. The scheduler 3 ignores a line corresponding to a queue buffer 2a, 2b, 2c, 2d in which no frame is stored. Therefore, it is possible to multiplex traffic of each line so that an output rate of each line becomes equal, by assigning the same weight to each line.

A bandwidth guarantee device for logic channels in physical lines including plural channels in which traffic flows generated by individual users are input is also proposed. The bandwidth guarantee device includes a scheduler that performs unbiased bandwidth division for each traffic flow, and a shaper that assigns a bandwidth to limit a rate of each channel without exceeding a bandwidth that is provided for each channel (for example, Japanese Patent Laid-open Publication No. 2000-49812). The shaper uses WRR when frames are transmitted from each channel buffer to an output buffer of the device.

However, the conventional frame multiplexer described above has following problems. Generally, a queue buffer is realized by a shared memory in view of achieving high memory utilization efficiency. Therefore, it is required to retrieve an empty address when writing a frame in the shared memory, and to release a used address when reading a frame in the shared memory. To manage such empty address of the shared memory, it is necessary to prepare a managing memory with an enough capacity to store a data amount corresponding to the number of addresses in the shared memory multiplied by address length.

The frame stored in the queue buffer is written on an arbitrary address in the shared memory. To manage an address of each frame on the memory, and an order thereof, it is necessary to prepare a managing memory with an enough capacity to store a data amount corresponding to queue buffer length multiplied by address length.

When the queue buffer retrieving control with WRR is employed in the best effort service that utilizes the maximum output rate of the frame multiplexer, frames are output without an unnecessary interval. Therefore, a time T0 that is necessary to read the shortest frame is equal to X0 divided by Y0, where X0 is length of the shortest frame of variable-length, and Y0 is an output rate of the frame multiplexer. Therefore, after determining to retrieve the shortest frame, the scheduler needs to determine the next frame to be retrieved within the time T0.

Therefore, the two managing memories described above are realized by an expensive synchronized random access memory (SRAM) to access the two memories within such a short time. The larger number of lines accommodated in the frame multiplexer leads to higher cost. A required capacity of the memory increases as the number of the accommodated lines increases, and therefore, requires a large SRAM. This leads to an increase in size of the frame multiplexer. Therefore, the number of the accommodated lines is disadvantageously limited even when more accommodated lines are desired. Moreover, the time T0 becomes shorter as an output speed of the frame multiplexer increases, and it becomes necessary to determine which frame is to be retrieved next within less time. Therefore, the output speed is limited even when the higher output speed is desired.

In addition, with the conventional device described above, high processing speed cannot be achieved because the device needs software to perform such complicated algorithm as multiplication and division. If the high speed processing is impossible, longer intervals are required for executing a control for allowing the plural lines to equally utilize the output bandwidth of the frame multiplexer. This leads to degradation of accuracy in equal division.

SUMMARY OF THE INVENTION

It is an object of the present invention to at least solve the above problems in the conventional technology.

A frame multiplexer according to one aspect of the present invention multiplexes a plurality of frames of variable length input from a plurality of lines. The frame multiplexer includes a plurality of counters each of which is provided for each of the lines; a flow monitoring unit that adds a value representing a length of a frame that passes through the frame multiplexer to a value of a counter provided for a line from which the frame is input; a bandwidth managing unit that cyclically selects one of active lines that are lines from which frames are input into the frame multiplexer among the lines, and that subtracts a token value from a value of a counter of the active line selected; and an output control unit that stores the frame that has passed through the flow monitoring unit in a queue buffer, and that controls to output the frame at an output rate.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings. In the following explanation, Ethernet which identifies a line by virtual local area network (VLAN) identification (ID) added to a frame is taken as an example.

Figure 1:
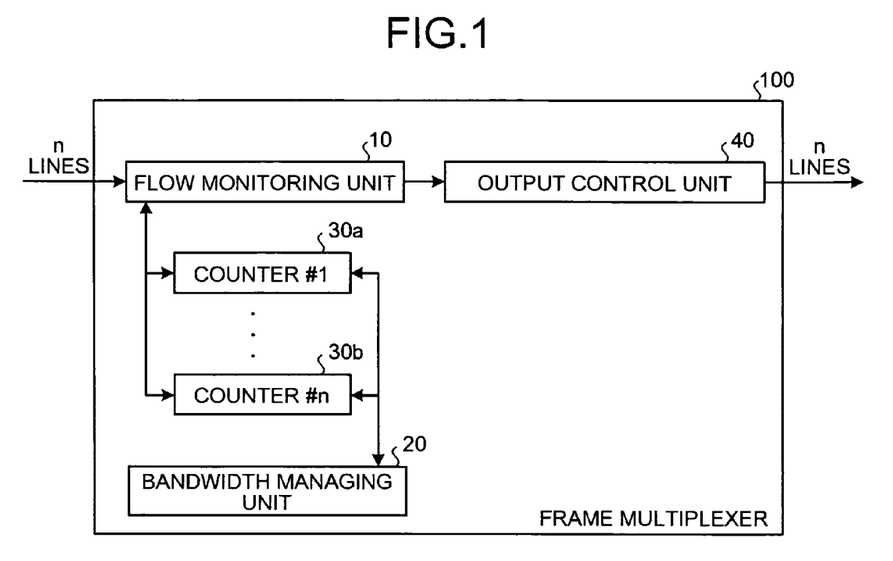
FIG. 1 is a block diagram of a frame multiplexer according to embodiments of the present invention.

FIG. 1 is a block diagram of a frame multiplexer according to an embodiment of the present invention. A frame multiplexer 100 includes a flow monitoring unit 10, a bandwidth managing unit 20, plural counters #1 to #n (30a to 30b), and an output control unit 40. The frame multiplexer 100 multiplexes frames of variable length input from n lines (n is an integer more than 1) and outputs the frames.

Each of the counters 30a to 30b is provided for each of the n lines. Each of the counters 30a to 30b includes a counter part and a sign bit (see FIG. 4). The counter part includes plural bits. For example, when the sign bit is "1", the counter part indicates a positive value, and when the sign bit is " ", the counter part indicates zero or a negative value. The sign bit "1" indicates that a frame is input into the frame multiplexer 100 through a line corresponding to the counter, in other words, a frame is passing through the line.

The flow monitoring unit 10 monitors an amount of frame flow on each line, and discards a frame when a value of the counter part exceeds the predetermined value, and allows a frame to pass when the value does not exceed the predetermined value. The flow monitoring unit 10 adds length of a passed frame to a value of the counter part of the counter for the line through which the frame is passed. The bandwidth managing unit 20 cyclically selects one of the lines through which a frame is currently passing, and subtracts a predetermined token value from a value of the counter part of the counter for the selected line.

The output control unit 40 stores frames output from the flow monitoring unit 10 in a queue buffer (first-in first-out (FIFO)) included therein, and reads out frames stored in the queue buffer to output the frames at an output rate. Therefore, according to the embodiment of the present invention, it is not necessary to provide a queue buffer for each line, thereby simplifying a structure of the queue buffer.

Figure 2:
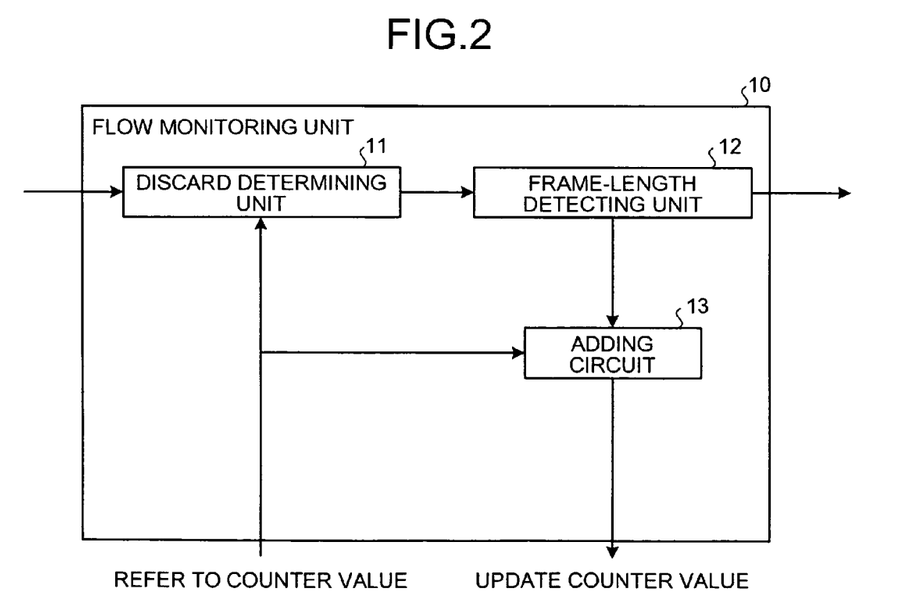
FIG. 2 is a block diagram of a flow monitoring unit.

FIG. 2 is a block diagram of the flow monitoring unit. The flow monitoring unit 10 includes a discard determining unit 11, a frame-length detecting unit 12, and an adding circuit 13. The discard determining unit 11 determines a frame to which a frame belongs based on the VLAN ID, and refers to a value of the counter part of the counter corresponding to the determined line. The discard determining unit 11 discards the frame when the value exceeds a predetermined threshold, and allows the frame to pass when the value does not exceed the threshold. The threshold corresponds to the size of the traffic burst acceptable for each line.

The frame-length detecting unit 12 detects length of a frame passed through the discard determining unit 11, and notifies the length to the adding circuit 13. The frame includes a VLAN tag, a preamble, a frame check sequence (FCS), and a minimum gap of 12 bytes defined by Ethernet. The adding circuit 13 adds a value that indicates the length notified by the frame-length detecting unit 12 to a value of the counter part of the counter for the frame which has passed through the discard determining unit 11. Thus, the flow monitoring unit 10 adds an amount of passed frames of each line to each of the counter parts.

Figure 3:
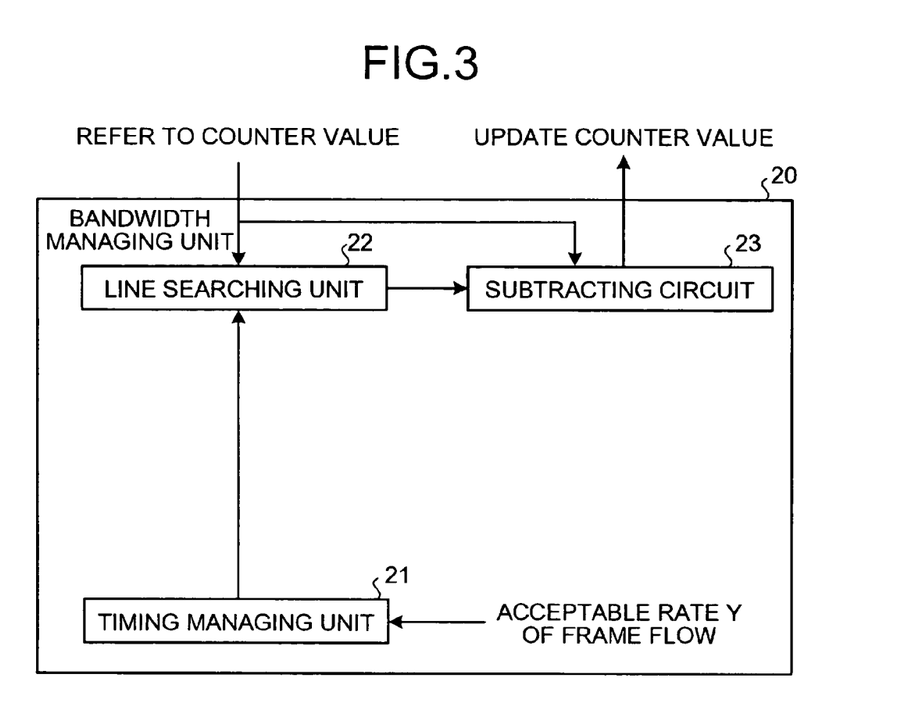
FIG. 3 is a block diagram of a bandwidth managing unit.
Figure 4:
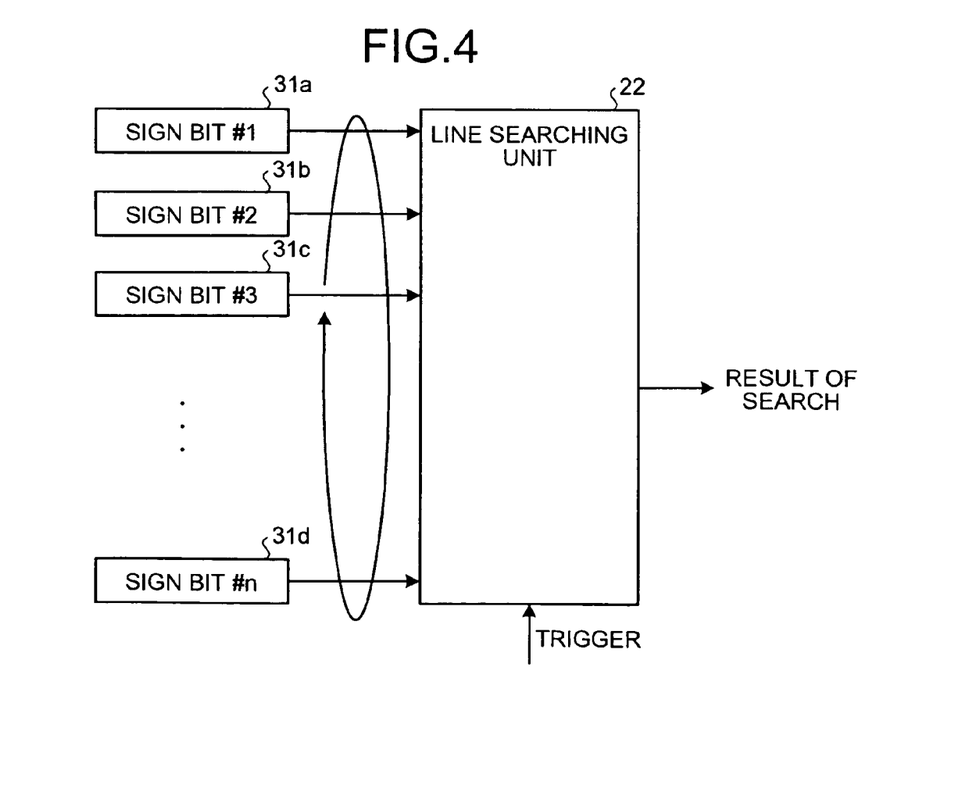
FIG. 4 is a schematic for illustrating an operation by a line searching unit.

FIG. 3 is a block diagram of the bandwidth managing unit. FIG. 4 is a schematic for illustrating an operation by the line searching unit. As shown in FIG. 3, the bandwidth managing unit 20 includes a timing managing unit 21, a line searching unit 22, and a subtracting circuit 23. The timing managing unit 21 generates a trigger in cycles of T (=X/Y) for managing a rate, where X is a constant token value, and Y is a predetermined acceptable rate of frame flow.

As shown in FIG. 4, the line searching unit 22 refers, when the trigger is input from the timing managing unit 21, to each of the sign bits #1 to #n (31a, 31b, 31c, . . . , 31d) of the counters 30a to 30b, and cyclically searches a line of which the sign bit is "1". WRR may be employed as the cyclic searching method. A weight assigned to each line may be ether equal or different. Note that an equal weight is assigned to each line in this example.

The line searching unit 22 selects a line that first matches, after the line searching unit 22 starts a search, the condition that the sign bit is "1". The line searching unit 22 notifies the subtracting circuit 23 of the selected line, and holds the data on the selected line. In the second cycle, the line searching unit 22 performs the search starting from a line following the selected line. When the line searching unit 22 selects a line in a descending order of a sequential number assigned to each line, the line following the selected line corresponds to a line having number smaller than that of the selected line by one. When the line searching unit 22 selects a line in ascending order of the sequential number, the line following the selected line corresponds to a line having number larger than that of the selected line by one.

The subtracting circuit 23 subtracts the token value X from a value of the counter part of the counter for the line notified by the line searching unit 22. Therefore, the constant token value X is subtracted equally from the counters 30a to 30b provided for lines through which a frame is passing. The total subtracted value corresponds to an acceptable flow amount in accordance with the acceptable rate Y per unit time. In other words, the acceptable flow amount of each line is subtracted from each of the counters 30a to 30b.

Figure 5:
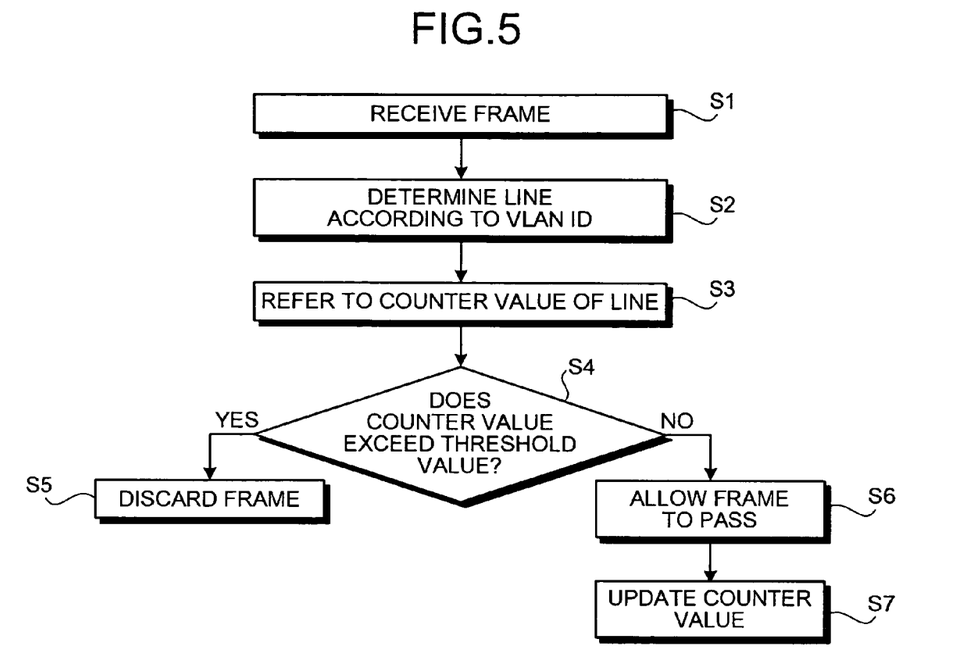
FIG. 5 is a flowchart of processings of monitoring a frame flow and updating a value of each counter performed by the flow monitoring unit.

FIG. 5 is a flowchart of processings of monitoring frame flow and updating a value of the counters performed by the flow monitoring unit. Upon receiving a frame input into the flow monitoring unit 10 (step S1), the discard determining unit 11 determines a line to which the frame belongs based on a VLAN ID of the frame (step S2). The discard determining unit 11 refers to a value of the counter part of the counter for the line (step S3).

The discard determining unit 11 compares the value with the threshold. When the value exceeds the threshold (step S4: YES), the discard determining unit 11 discards the frame (step S5). When the value does not exceed the threshold (step S4: NO), the discard determining unit 11 allows the frame to pass (step S6). The frame-length detecting unit 12 detects length of the passed frame, and the adding circuit 13 updates the value of the counter (step 7).

Figure 6:
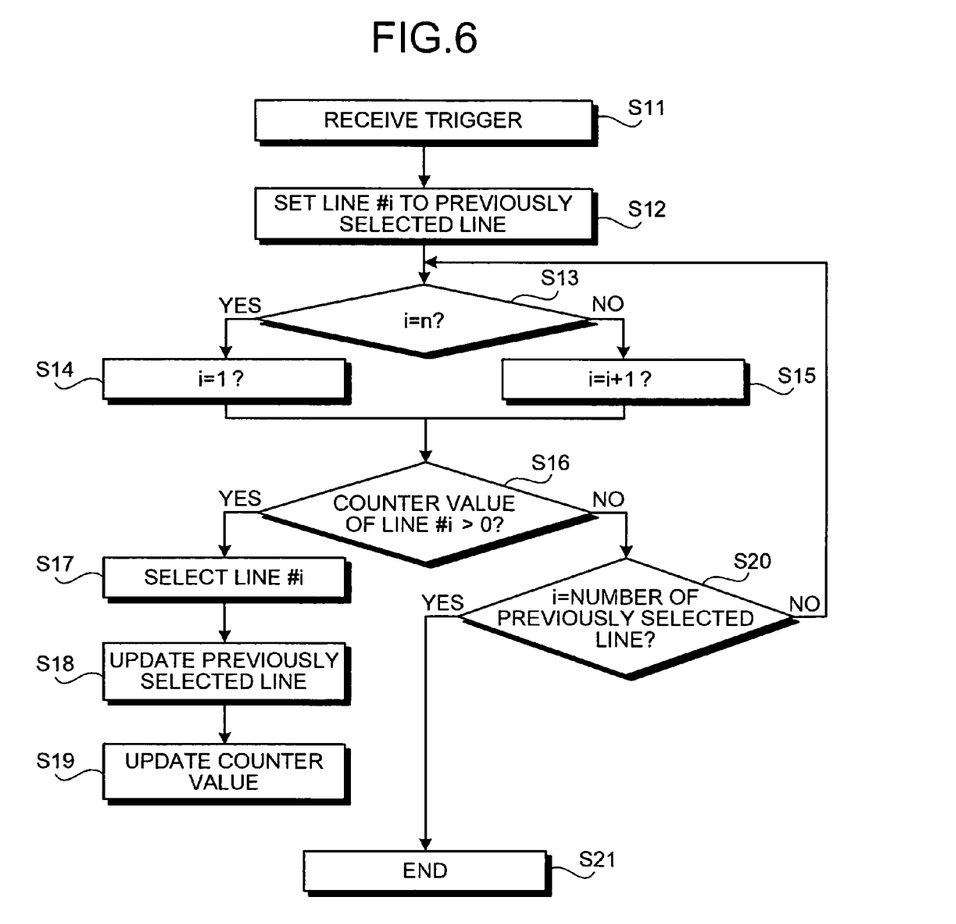
FIG. 6 is a flowchart of processings of searching a line and updating a value of each counter performed by the bandwidth managing unit.

FIG. 6 is a flowchart of processings of searching a line and updating a value of the counter performed by the bandwidth managing unit. Hereinafter, i (i is an integer: $1 \leq i \leq n$) indicates a sequential number assigned to each line. The bandwidth managing unit 20 searches a line in an ascending order of the sequential number. Line #i indicates the line to which the sequential number i is assigned. Upon receiving a trigger from the timing managing unit 21 (step S11), the line searching unit 22 sets i to a sequential number of the previously selected line (step S12). Note that the line searching unit 22 sets 1 to i when the line searching unit 22 starts searching at the beginning.

Then, the line searching unit 22 determines whether i is n (step S13). n is the maximum value of the sequential numbers. When i is n (step S13: YES), the line searching unit 22 sets 1 to i (i=1) (step S14). When i is not n (step S13: NO), the line searching unit 22 sets i+1 to i (i=i+1) (step S15). In other words, when the previously selected line is line #n (step S13: YES), the line searching unit 22 starts searching starting from line #1. In other cases (step S13: NO), the line searching unit 22 starts searching starting from a line assigned a number following to the number of the previously selected line.

Then, the line searching unit 22 determines whether a value of the counter part for line #i is more than 0 (step S16). When the counter part is more than 0 (step S16: YES), the line searching unit 22 selects line #i (step S17). The line searching unit 22 updates the data of the previously selected line to the data of the currently selected line (step S18). Then, the subtracting circuit 23 updates the counter part for line #i (step S19).

On the other hand, when a counter part for line #i is less than 0 (step S16: NO), the line searching unit 22 determines whether i is the number of the previously selected line (step S20). When i is the number of the previously selected line (step S20: YES), the line searching unit 22 finishes searching (step S21). When i is not the number of the previously selected line (step S20: NO), the line searching unit 22 continues searching from step S13.

As a result of the processing described above, a value of a counter part of each counter indicates a value of (an amount of frames passed through each line)−(an acceptable amount of frames passed through each line). As described above, the discard determining unit 11 discards a frame when a value of a counter part exceeds the threshold, and the bandwidth managing unit 20 subtracts the token value from a value of the counter part when the value of the counter part is positive. Therefore, an amount of frames passed through each line is (the acceptable amount of passed frames of each line)+(the predetermined threshold of each line). The acceptable amount of passed frames is equalized among the lines.

The token value X is set to be longer than a value of the minimum length of frames of variable-length input into the frame multiplexer. Hereinafter, the token value X is set to be the same value that indicates length of the maximum length of the frames. A time required to the processing performed by the line searching unit 22 depends on the rate managing cycle T. Therefore, the token value X is changeable according to the quality of the processing. Furthermore, the output rate of the frame multiplexer 100, in other words, the output rate of the output control unit 40 is employed as the acceptable rate Y of frame flow. The acceptable rate Y is also changeable to arbitrary value.

A specific example will be explained. Note that the present invention is not limited to the example. Set parameters and traffic are determined as follows.

(1) Set Parameters

The number of lines accommodated in the frame multiplexer 100 is 1000. The token value X is 1542 bytes that is the sum of the maximum length of Ethernet frame of 1518 bytes, VLAN tag of 4 bytes, preamble of 8 bytes, and the minimum gap of 12 bytes. The acceptable rate Y of frame flow is 1 giga bit per second (Gbps). Therefore, the rate managing cycle T is 12.336 micro second (µs) according to the following equation:

$$1542 \text{ (bytes)} \times 8 \text{ (bit/bite)} \div 10^9 \text{ (bit/s)} \times 10^6 = 12.336 \text{ (µs)}$$

The threshold of each line is 128 kilo bytes (kbytes). The FIFO size including the queue buffer of the output control unit 40 is 32 mega bytes (Mbytes). When the FIFO is managed by 128 bytes unit, the required number of an address is 262144 according to the following expression:

$$32 \times 1024^2 \text{ (byte)} \div 128 \text{ (byte)} = 262144 = 2^{18}$$

Therefore, the number of bit required to express an address is 18 bits.

(2) Traffic

As for line #1 to #498, an input rate is 10 Mbps, and length of a frame is 532 bytes. As for line #499, an input rate is 2 Mbps, length of a frame is 84 bytes. As for line #500, an input rate is 100 Mbps, length of a frame is 1542 bytes. As for line #501 to line #1000, no frame is input. Each of the frames includes VLAN tag, preamble, the minimum gap of FCS and Ethernet.

Under the condition described above, each of the counter parts for line #1 to line #498 and line #500 is 128 kbytes (131072 bytes) because a frame is continuously input to each line. And the counter part for line #499 is 84 bytes (a size of one frame). Furthermore, the previously selected line is line #500. Hereinafter, counter #1 indicates a value of the counter part for line #i. A value of each of the counter parts for line #501 to line #1000 is always 0, therefore those lines can be omitted.

(3) In the Beginning of Searching

Each of counters #1 to #498 is 131072 bytes. Counter #499 is 8 bytes. Counter #500 is 131072 bytes.

(4) In the $1^{st}$ Cycle of Searching

The line searching unit 22 starts the search from line #501. As each of counters #501 to #1000 is 0, the line searching unit 22 does not select line #501 to line #1000. Then, the line searching unit 22 continues searching from line #1, and selects line #1. As a result, the subtracting circuit 23 subtracts 1542 bytes from counter #1. Each of other counters remains the same as in the beginning of the search.

(5) In the $2^{nd}$ Cycle of Searching

The line searching unit 22 starts the search from line #2, and selects line #2. As a result, the subtracting circuit 23 subtracts 1542 bytes from counter #2. Therefore, counter #2 becomes 129530. Counter #1 is still 129530 bytes. Each of other counters remains the same as when the search in the $1^{st}$ cycle is finished.

(6) In the $3^{rd}$ to $498^{th}$ Cycle of Searching:

Likewise as the search in the $2^{nd}$ cycle, the line searching unit 22 sequentially selects line #3, line #4, . . . , and line #498. Then, the subtracting circuit 23 subtracts 1542 bytes from each of counter #3, counter #4, . . . , counter #498. Therefore, after the search in the $498^{th}$ cycle is finished, each of counter #1 to counter #498 becomes 129530 bytes. Counter #499 and counter #500 are still same as when the search in the $2^{nd}$ cycle is finished.

(7) In the $499^{th}$ Cycle of Searching

The line searching unit 22 starts searching from line #499, and selects line #499. As a result, the subtracting circuit 23 subtracts 1542 bytes from counter #499. Therefore, counter #499 becomes −1458 bytes. Each of other counters is the same as when the search in the 498$^{th}$ cycle is finished.

(8) In the 500$^{th}$ Cycle of Searching

The line searching unit 22 starts the search from line #500, and selects line #500. As a result, the subtracting circuit 23 subtracts 1542 bytes from counter #500. Therefore, counter #500 becomes 1295 bytes. Each of other counters is the same as when the search in the 498$^{th}$ cycle is finished.

By this time, time corresponding to 500 cycles has elapsed, and some frames have been input in each line in the elapsed time. An amount of input frames is represented by the following expression.

An input rate/length of the input frame×elapsed time

Each amount of input frames of line #1 to line #498 is approximately 14 frames as follows.

10×10$^6$ (bit/second)÷8 (bit/bite)÷532 (byte/frame)× 12.336×10$^{−6}$ (second/cycle)×500 (cycle)=14.4 (frame)

An amount of input frames of line #499 is approximately 18 frames as follows.

2×10$^6$ (bit/second)÷8 (bit/byte)÷84 (byte/frame)× 12.336×10$^{−6}$ (second/cycle)×500 (cycle)=18.3 (frame)

An amount of input frames of line #500 is approximately 50 frames as follows.

100×10$^6$ (bit/second)÷8 (bit/bite)÷1542 (byte/frame)× 12.336×10$^{−6}$ (second/cycle)×500 (cycle)=50 (frame)

Referring to each of the counters when the search in the 500$^{th}$ cycle is finished, the threshold of each line 128 kbytes explained at (1) set parameters, and an amount of input frames within the elapsed time for 500 cycles, the number of frames of each line which can pass through the discard determining unit 11 is 3 frames for each of line #1 to line #498, 18 frames for line #499, and 1 frame for line #500.

Adding an amount of frames that has passed by the time the search in the 500$^{th}$ cycle is finished, a value of each counter when the search is finished is 131126 for each of counter #1 to counter #498, 54 bytes for counter #499, and 131072 bytes for counter #500.

(9) In the 501$^{st}$ Cycle of Searching

The line searching unit 22 starts searching from line #501. Each of counter #501 to #1000 is 0, therefore, not selected. The line searching unit 22 continues searching from line #1, and selects line #1. As a result, the subtracting circuit 23 subtracts 1542 bytes from counter #1. Therefore, counter #1 indicates 129584 bytes. Each of other counters is the same as when the search in the 500$^{th}$ cycle is finished.

(10) In the 502$^{nd}$ Cycle of Searching

The line searching unit 22 starts searching from line #2, and selects line #2. As a result, the subtracting circuit 23 subtracts 1542 bytes from counter #2. Therefore, counter #2 indicates 129584 bytes. Counter #1 is still 129584 bytes. Each of other counters is the same as when the search in the 500$^{th}$ cycle is finished.

(11) In the 503$^{rd}$ to 998$^{th}$ Cycle of Searching

As the search in the 502$^{nd}$ cycle, the line searching unit 22 sequentially selects line #3, line #4, . . . , and line #498. The subtracting circuit 23 subtracts 1542 bytes from line #3, line #4, . . . , line #498, and each of counter #3, counter #4, . . . , counter #498 indicates 129584 bytes. Therefore, each of counter #1 to counter #498 is 129584 bytes when the search in the 998$^{th}$ cycle is finished.

(12) In the 999$^{th}$ Cycle of Searching

The line searching unit 22 starts searching from line #499, and selects line #499. As a result, the subtracting circuit 23 subtracts 1542 bytes from counter #499. Therefore, counter #499 indicates −1488 bytes. Each of other counters is the same as when the search in the 998$^{th}$ cycle is finished.

(13) In the 1000$^{th}$ Cycle of Searching

The line searching unit 22 starts searching from line #500, and selects line #500. As a result, the subtracting circuit 23 subtracts 1542 bytes from counter #500. Therefore, counter #500 indicates 129530 bytes. Each of other counters is the same as when the search in the 999$^{th}$ cycle is finished.

When the search in the 1000$^{th}$ cycle is finished, the subtracting circuit 23 has subtracted the token value 3084 bytes from each of counter #1 to counter #498, counter #499, and counter #500, and 0 byte from each of counter #501 to counter #1000. An elapsed time for 1000 cycles is 12.336 milliseconds (ms) (=12.336 μs×1000). Therefore, when the subtracted token value is expressed by rate, every rate of line #1 to line #498, line #499, line #500 is 2 Mbps, and every rate of line #501 to line #1000 is 0 Mbps.

If the line searching unit 22 continues searching from 1001$^{st}$ cycle onward, a token value 2 Mbps that is an output rate divided by the number of lines through which a frame is passing is subtracted from each counter of the lines. As a result, an amount of frames that can pass the frame multiplexer 100 is the threshold of 128 kbytes and the output rate of 2 Mbps for line #1 to line #500. The output control unit 40 stores a passed frame in the queue buffer, and outputs the frame at 1 Gbps. Thus, the frame multiplexer 100 multiplexes frames of plural lines to allow each of the lines to equally utilize the bandwidth.

A memory size required in the example explained above will be compared with a memory size required in the queue buffer retrieving method with WRR. In the case of the example, an address to indicate a start point and an end point of FIFO is necessary. Therefore, a memory size required to manage the queue buffer is 36 bits (=18 bits×2).

The maximum value of the counters is 132613 bytes (=the threshold 128 kbytes−1+the maximum length of frames 1542 bytes). Therefore, it requires 18 bits to express the maximum value. Furthermore, it requires 1 bit for a sign bit of a counter. Therefore, 19 bits are required for a counter of a line. As a result, the number of memory bit required to include counters of 1000 lines is 19000 bits.

In the case of the queue buffer retrieving method with WRR, the number of memory bit required to retrieve an empty address and to release a used address in the shared buffer is 4718592 bits (=number of address 262144×length of address 18). Assuming length of the queue is the same as 128 kbytes in the example explained above, the minimum length of frames of Ethernet is 84 bytes, therefore, 1560 frames are required to at most to be stored in the queue buffer. Therefore, the number of memory bit required to include queue buffers for 1000 lines is 28080000 bits (=length of frame 1560× length of address 18×number of lines 1000)

As explained above, the sum 19036 bits is necessary for a memory to include counters and for a memory to manage the queue buffer in the example. While, in the queue buffer retrieving method with WRR, the total 32798592 bits is necessary for a memory to manage an empty address and for a memory to include the queue buffer. Therefore, the memory required in the example is 1/1700 of the memory required in the queue buffer retrieving method with WRR. Thus, much reduction of the required memory makes it possible to increase the number of lines accommodated in the frame multiplexer without increasing cost and size of the device.

A line is searched in a cycle of 12.336 µs in the example. The processing of the line searching unit 22 and the subtracting circuit 23 needs to be performed within the cycle. While, in the case of the queue buffer retrieving method with WRR, a time T0 to retrieve the minimum length of frames is 0.672 µs, and it is necessary to search a line to retrieve the next frame within the time. Thus, longer time to search a line makes it possible to increase the output speed.

Figure 7:
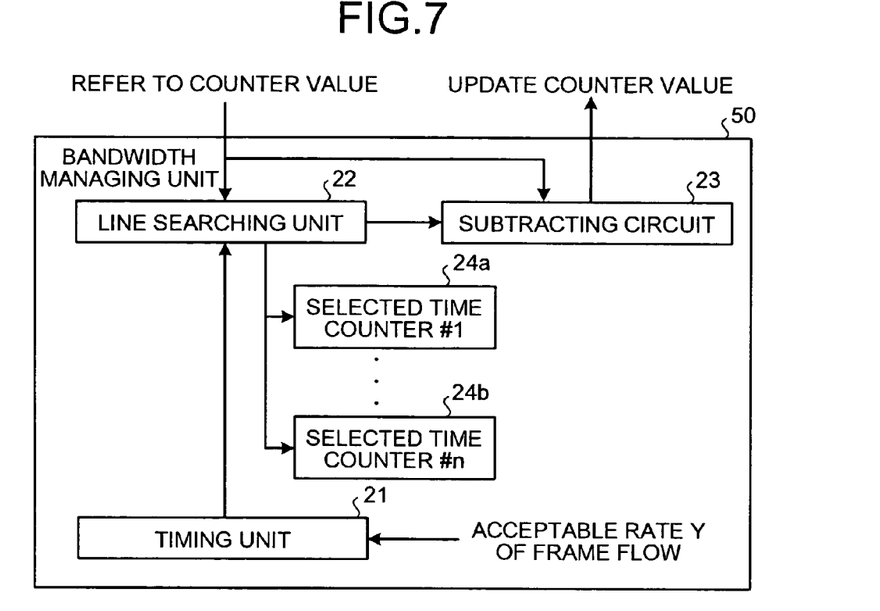
FIG. 7 is a block diagram of another bandwidth managing unit.

FIG. 7 is a block diagram of another bandwidth managing unit. The bandwidth managing unit 50 includes a selection counter 24a, . . . , 24b for each of n lines, in a similar manner as the bandwidth managing unit 20 shown in FIG. 3.

Each of the selection counters #1 to #n (24a to 24b) counts number of times a line corresponding to the counter is selected by the line searching unit 22. The line searching unit 22 increments each value of the selection counters #1 to #n (24a to 24b) for the selected line during a processing of the line searching explained above.

Although not shown, the bandwidth managing unit 50 may multiply each value of the selection counters 24a to 24b by the token value, and output the product. Simple network management protocol (SNMP) or command line interface (CLI) is taken as an example to output the product.

The product indicates an acceptable amount of passing frames. An amount of passed frames is each threshold of the counters 30a to 30b added to each acceptable amount of passing frames. Therefore, an amount of passed frames can be calculated within the threshold error. Thus, it is possible for an operator to monitor an amount of passing frames of each line and to find an abnormal line of a client in the case of a device into which a client line is input. Furthermore, it is possible to unerringly determine whether repair of upper layer network is required.

Furthermore, as explained in the example, assuming that the token value is 1542 bytes, an amount of memory required to monitor an amount of passing frames is $1/1542$ when an amount of passing frames is managed by byte. Various modifications may be applied to the present invention.

According to the embodiments described above, the number of the lines accommodated in a frame multiplexer can be increased, and an output speed of the frame multiplexer can be increased.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A frame multiplexer that multiplexes a plurality of frames of variable length input from a plurality of lines, the frame multiplexer comprising:
   a plurality of counters each of which is provided for each of the plurality of lines;
   a flow monitoring unit that adds a value representing a length of a frame that passes through the frame multiplexer to a value of a counter provided for a line from which the frame is input;
   a bandwidth managing unit that selects, from among the plurality of lines and in a repeated sequence, active lines from which the plurality of frames are input into the frame multiplexer, and that subtracts a constant token value from a value of a counter of an active line selected; and
   an output control unit that stores the frame that has passed through the flow monitoring unit in a queue buffer, and that reads out the frame from the queue buffer at a constant output rate,
   wherein each of the plurality of counters includes a counter part having a plurality of bits indicating a counted value, and a sign bit indicating whether the counted value indicated by the counter part is positive, and
   wherein the active lines are the plurality of lines of which the counted value is positive.

2. The frame multiplexer according to claim 1, wherein the flow monitoring unit includes a discard determining unit that discards, when a counter of a specific line exceeds a threshold predetermined for the specific line, a frame input from the specific line.

3. The frame multiplexer according to claim 2, wherein a size of traffic burst acceptable for each of the plurality of lines is set as the threshold.

4. The frame multiplexer according to claim 1, wherein the bandwidth managing unit includes a timing managing unit that generates a trigger for selecting the active line in cycles that are determined by dividing the token value by a predetermined acceptable rate.

5. The frame multiplexer according to claim 4, wherein the bandwidth managing unit includes a line searching unit that refers to at least one of the plurality of counters to select one of the active lines upon receiving the trigger.

6. The frame multiplexer according to claim 5, wherein the bandwidth managing unit includes a plurality of selection counters for counting number of times for which each of the plurality of lines is selected by the line searching unit.

7. The frame multiplexer according to claim 4, wherein the token value is larger than a value representing a minimum frame length of the plurality of frames.

8. The frame multiplexer according to claim 4, wherein the token value is equal to a value representing a maximum frame length of the plurality of frames.

9. The frame multiplexer according to claim 4, wherein the predetermined acceptable rate is equal to the output rate.

10. The frame multiplexer according to claim 1, wherein the bandwidth managing unit searches one of the active lines using a weighted round robin method.

11. The frame multiplexer according to claim 10, wherein the bandwidth managing unit selects one of the active lines to which an identical weight is assigned in the weighted round robin method.

12. The frame multiplexer according to claim 10, wherein the bandwidth managing unit selects one of the active lines to which different weights are assigned in the weighted round robin method.

13. A method of multiplexing a plurality of frames of variable length input from a plurality of lines, comprising:
   providing a counter for each of the plurality of lines;
   adding a value representing a length of a frame that passes through a frame multiplexer to a value of a counter provided for a line from which the frame is input;
   selecting active lines from which the plurality of frames are input into the frame multiplexer from among the plurality of lines and in a repeated sequence;
   subtracting a constant token value from a value of a counter of an active line selected;
   storing the frame that has passed through the flow monitoring unit in a queue buffer; and
   reading out the frame from the queue buffer at a constant output rate,
   wherein the counter for each of the plurality of lines includes a counter part having a plurality of bits indicating a counted value, and a sign bit indicating whether the counted value indicated by the counter part is positive, and wherein the active lines are the plurality of lines of which the counted value is positive.

14. A method of multiplexing a plurality of frames of variable length input from a plurality of lines, comprising:
providing a counter for each of the plurality of lines;
monitoring a flow of the plurality of frames;
adding a value representing a length of a flow monitored frame to a value of a counter provided for a line from which the flow monitored frame is input;
selecting an active line of the plurality of lines from which the plurality of frames are input in a repeated sequence;
subtracting a constant token value from a value of a counter of the active line;
storing the flow monitored frame in a queue buffer, and
reading out the flow monitored frame at a constant output rate,
wherein the counter for each of the plurality of lines includes a counter part having a plurality of bits indicating a counted value, and a sign bit indicating whether the counted value indicated by the counter part is positive, and
wherein active lines are the plurality of lines of which the counted value is positive.

* * * * *